US007001577B2

(12) United States Patent
Zimmerman et al.

(10) Patent No.: US 7,001,577 B2
(45) Date of Patent: Feb. 21, 2006

(54) LOW OXYGEN CUBIC BORON NITRIDE AND ITS PRODUCTION

(75) Inventors: Michael H. Zimmerman, Westerville, OH (US); Erik O. Einset, Delaware, OH (US)

(73) Assignee: Diamond innovaitons, Inc., Worhtington, OH (US)

( * ) Notice: Subject to any disclaimer, the term of this patent is extended or adjusted under 35 U.S.C. 154(b) by 410 days.

(21) Appl. No.: 10/001,573

(22) Filed: Nov. 2, 2001

(65) Prior Publication Data

US 2003/0099587 A1   May 29, 2003

(51) Int. Cl.
C01B 21/064   (2006.01)
(52) U.S. Cl. ...................................... 423/290
(58) Field of Classification Search ................ 423/290
See application file for complete search history.

(56) References Cited

U.S. PATENT DOCUMENTS

| | | | |
|---|---|---|---|
| 3,701,826 A | | 10/1972 | Fleischer et al. |
| 3,768,972 A | * | 10/1973 | Taylor et al. ............... 423/290 |
| 3,918,219 A | * | 11/1975 | Wentofr, Jr. et al. ........ 423/290 |
| 4,148,863 A | * | 4/1979 | Farafontov et al. ......... 423/290 |
| 4,349,517 A | * | 9/1982 | Lysanov et al. ............ 423/290 |
| 5,147,623 A | * | 9/1992 | Eun et al. ................... 423/290 |
| 5,618,509 A | * | 4/1997 | Shioi et al. ................. 423/290 |
| 5,837,214 A | * | 11/1998 | Shioi et al. ................. 423/290 |
| 6,508,996 B1 | * | 1/2003 | Shioi et al. ................. 423/290 |

FOREIGN PATENT DOCUMENTS

| | | | |
|---|---|---|---|
| EP | 1 074 530 A | | 2/2001 |
| FR | 2686101 | * | 7/1993 |
| GB | 2058840 | * | 4/1981 |
| WO | WO 99 25468 A | | 5/1999 |

OTHER PUBLICATIONS

Abstract of Japanese 358060604, Apr. 11, 1983.*
Tadao Sato et al, "Effect of Oxygen on the Growth of Cubic Boron Nitride using Magnesium", *Journal V, Cont. of Materials Science* (1981), 16(7), 1829-34 (Abstract only) (no month), 1981.*
Abstract of Japanese 355032772, Mar. 7, 1980.*
Database WPI; Section Ch. Week 199830, Derwent Publications Ltd., London, GB; AN 1998-346222, XP002238233 & RU 2 098 388 C (Temp Stock Co), Dec. 10, 1997 abstract.

* cited by examiner

*Primary Examiner*—Wayne A. Langel
(74) *Attorney, Agent, or Firm*—Pepper Hamilton LLP

(57) ABSTRACT

A method for improving the toughness of a CBN product made by a high temperature/high pressure (HP/HT) process commences by forming a blend of an oxygen getter and CBN product-forming feedstock. The blend is subjected to a CBN high temperature/high pressure (HP/HT) process for forming a CBN product. The amount of oxygen getter in the blend is sufficient to improve the toughness of the CBN product. The resulting CBN product desirably has an oxygen content of less than about 300 ppm. Oxygen getters include Al, Si, and Ti. The HP/HT process is conducted in the absence or presence of catalytic materials.

10 Claims, 2 Drawing Sheets

LOW OXYGEN CUBIC BORON NITRIDE AND ITS PRODUCTION

CROSS-REFERENCE TO RELATED APPLICATIONS

None

STATEMENT REGARDING FEDERALLY SPONSORED RESEARCH

Not applicable.

BACKGROUND OF THE INVENTION

The present invention relates to cubic boron nitride (CBN) materials and more particularly to a CBN product, which has very high toughness and high thermal stability.

Cubic boron nitride (CBN) is the second hardest material known to man after diamond. The manufacture of CBN by the high pressure/high temperature (HP/HT) process is known in the art and is typified by the process described in U.S. Pat. No. 2,947,617, a basic monocrystalline CBN case. U.S. Pat. No. 4,188,194 describes a process for making sintered polycrystalline CBN compacts which utilizes pyrolytic hexagonal boron nitride (PBN) in the absence of any catalyst. An improvement on such direct conversion process is disclosed in U.S. Pat. No. 4,289,503 wherein boric oxide is removed from the surface of the HBN powder before the conversion process. U.S. Pat. No. 5,106,792 manufactures a CBN composite mass from a mixture of different structural forms of graphitic boron nitride (CBN) in the absence of any catalyst.

A compact is a mass of abrasive particles bonded together in a self-bonded relationship (see U.S. Pat. Nos. 3,852,078 and 3,876,751); by means of a bonding medium (U.S. Pat. Nos. 3,136,615, 3,233,988, 3,743,489, 3,767,371, and 3,918,931); or by means of combinations thereof. A composite compact is a compact bonded to a substrate material, such as cemented metal carbide. U.S. Pat. No. 3,918,219 teaches the catalytic conversion of hexagonal boron nitride (HBN) to CBN in contact with a carbide mass to form a composite CBN compact. Compacts or composite compacts may be used in blanks for cutting tools, drill bits, dressing tools, and wear parts (see, for example, U.S. Pat. Nos. 3,136,615 and 3,233,988).

Polycrystalline CBN compacts often are used in machining hard ferrous alloy workpieces due to their relatively non-reactivity with ferrous workpieces. Accordingly, CBN materials often are formed into cutting, milling, and turning tools. The toughness of the CBN crystals, as measured by a standard friability test, can be a factor in grinding performance. The friability test involves ball milling a quantity of product under controlled conditions and sieving the residue to measure the breakdown of said product. The toughness index (TI) is measured at room temperature, and the thermal toughness index (TTI) is measured after the product has been fired at a high temperature. In many cases, the tougher the crystal, the longer the life of the crystal in a grinding or machining tool and, therefore, the longer the life of the tool. This leads to less tool wear and, ultimately, lower overall tool cost.

Corrigan, et al., "Direct Transition Among Allotropic Forms of Boron Nitride at High Pressures and Temperatures", *The Journal of Chemical Physics*, Vol 63. No. 9, page 3812 (Nov. 1, 1975) discusses the effects of impurities (e.g., oxygen) in the HP/HT conversion of HBN to CBN (see page 3814). Dreger, et al., "Sublimation and Decomposition Studies on Boron Nitride and Aluminum Nitride", *J. Phys. Chem.*, 66, p. 1556 (1962) proposes heating BN to 1200°–2000° C. to evolve nitrogen gas and leave a coating of boron. Vacuum firing of isotropic HBN to remove boron oxide preparatory to metallizing is mentioned in U.S. Pat. No. 3,926,571 at col. 3. Preliminary drying of HBN is disclosed in U.S. Pat. No. 4,150,098 at col. 3. Finally, U.S. Pat. No. 4,289,503 pre-treats HBN at a temperature in the HBN thermal decomposition range by vacuum firing or heating under inert atmosphere to remove boric oxide and leave a surface coating of boron. The pre-treated HBN, then, is converted into CBN.

BRIEF SUMMARY OF THE INVENTION

Regardless of the technique employed to manufacture CBN product, the toughness index (TI) of the CBN product can be improved by conducting the high temperature/high pressure (HP/HT) manufacturing process in the presence of an oxygen getter. Oxygen getters include, inter alia, Al, Si, and Ti. The HP/HT process is conducted conventionally, including in the absence or presence of catalytic materials. Optionally, the HBN feedstock to the HP/HT process can be pre-treated to remove oxides therefrom.

Another aspect of the present invention is a CBN product having an oxygen content of less than about 300 ppm, advantageously less than about 200 ppm, and preferably less than about 100 ppm.

Advantages of the present invention include the ability to improve the toughness index of any CBN product, regardless of how it is manufactured. Another advantage is the ability to improve the toughness index of a CBN product without deleteriously adversely affecting other desired properties of the CBN product. A further advantage is the ability to make an ultra-low oxygen-containing CBN product. These and other advantages will be apparent to those skilled in the art based on the present disclosure.

BRIEF DESCRIPTION OF THE DRAWINGS

For a fuller understanding of the nature and objects of the present invention, reference should be made to the following detailed description taken in conjunction with the accompanying drawings, in which.

Figure 1:
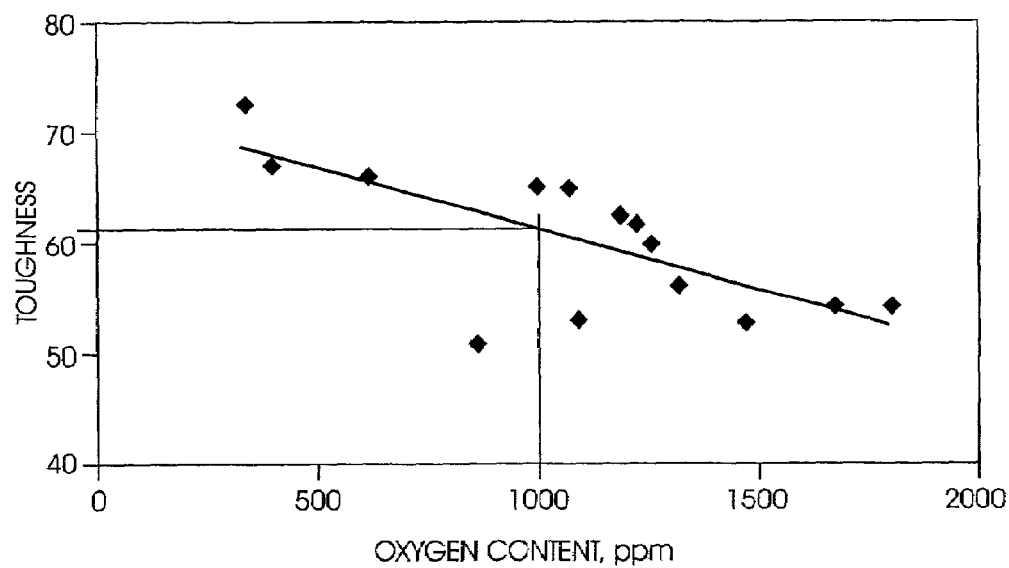
FIG. 1 plots crystal toughness versus oxygen content for a variety of CBN crystals as manufactured.

The drawings will be described in more detail below.

DETAILED DESCRIPTION OF THE INVENTION

The present invention is directed to CBN crystals having measured oxygen levels below, for example, about 300 ppm. Such crystals can be grown by any known chemistry under conditions that exclude oxygen, such as, for example, by including oxygen gettering materials (an "oxygen getter") in the growth chemistry. Suitable oxygen getters include, for example, Al, Si, or Ti, which form very stable oxides, can act to lower the oxygen in the synthesis chemistry to yield crystals having oxygen levels below the target about 300 ppm.

The amount of oxygen getter added to the feedstock is sufficient to lower the oxygen content of the CBN product to the desired level, i.e., achieve a desired target TI. Excess amounts of oxygen getter can be used at the risk of affecting other desired properties of the CBN product. Broadly, then, the amount of oxygen getter can range from about 0.005 to 0.5 wt-% of the feedstock to the reaction cell.

The oxygen getter, for example, Al, Si, or Ti, can be present in the reaction cell in one or more of the following forms: (a) elemental metal, and (b) any compound whose free energy of formation is higher than that of the oxide, carbide, nitride, etc., of the metal. The oxygen getter is converted into an oxide during the CBN manufacturing process. Such oxygen getter oxides generally are not incorporated into the CBN crystals, making their removal by subsequent processing practical and not cost prohibitive.

Any technique for production of CBN crystals can be used in accordance with the present invention. Thus, sintered CBN crystals, compacts and re-sintered CBN material can have its toughness improved by reducing the amount of oxygen present. In the catalytic formation of CBN, catalytic and bonding materials may be used, such as detailed in U.S. Pat. Nos. 3,233,988 and 3,918,219 with reference to catalytically formed CBN compacts and U.S. Pat. Nos. 3,743,489 and 3,767,371 with respect to bonding mediums. Single crystal CBN also can be made in the presence of catalyst metal or alloy from HBN.

A preferred direct conversion process is taught in U.S. Pat. No. 4,188,194 wherein a sintered polycrystalline CBN compact is made by placing preferentially oriented pyrolytic hexagonal boron nitride (PBN) in a reaction cell wherein the boron nitride is substantially free of catalytically active materials. Reaction cell conditions include a pressure of between about 50 and 100 Kbars and a temperature of at least about 1800° C. within the CBN stable region of the BN phase diagram. When HBN is milled to a small particle size, an improved process is disclosed in U.S. Pat. No. 4,289,503 wherein the boric oxide is removed from the surface of the HBN powder before the conversion process. U.S. Pat. No. 5,106,792 manufactures a CBN/CBN composite mass from mixtures of different structural forms of GBN. U.S. Pat. No. 4,673,414 re-sinters polycrystalline CBN by a catalyst-free HP/HT process. Variations on these processes also are known in the art. The disclosure of these citations is expressly incorporated herein by reference. Thus, a HP/HT process for forming a CBN product and a CNB product-forming feedstock can be found in the references cited herein.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

EXAMPLES

Example 1

Figure 2:
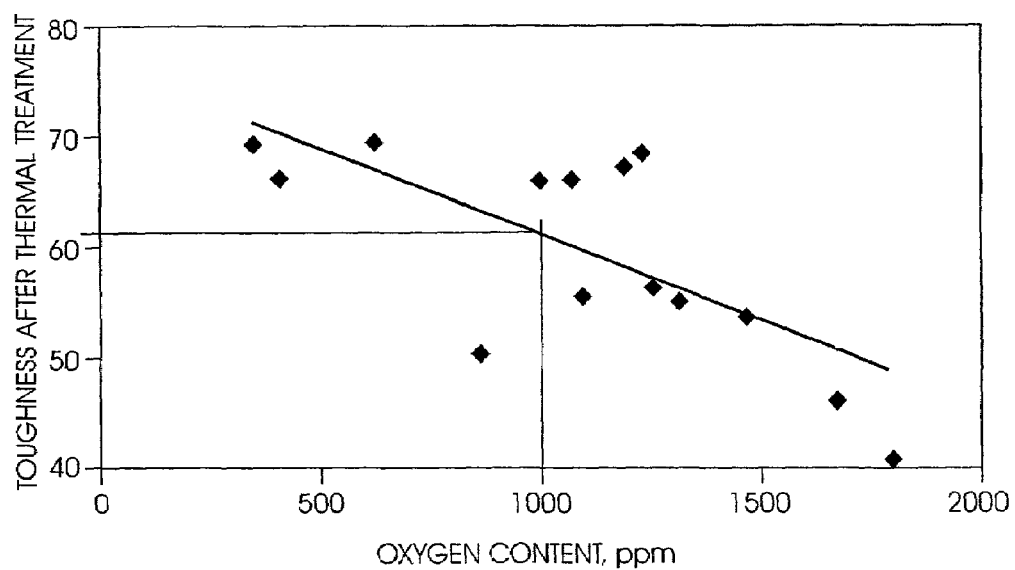
FIG. 2 plots crystal toughness versus oxygen content for a variety of CBN crystals that have been subjected to heat treatment.

FIG. 1 shows crystal toughness, as measured by a standard toughness test, versus oxygen content, as measured by a LECO oxygen and nitrogen analyzer (Model TC436, supplied by Leco Corporation, 3000 Lakeview Avenue, St. Joseph, Mich.) for a variety of CBN products. These CBN products were made from catalyst systems containing primarily alkali and alkaline earth metal nitrides, amides, hydroxides, and hydrides. Similarly, FIG. 2 shows crystal toughness after thermal treatment at 800° C. for 30 minutes versus oxygen content. Thermal treatment of the CBN product is intended to simulate the thermal profile experienced by the CBN crystals during wheel manufacture. The data for FIGS. 1 and 2 also are set forth in Table 1, below.

TABLE 1

| Average Oxygen Concentration (ppm) | Standard Deviation | Weight Assigned for Linear Regression | Toughness Index (TI) | Thermal Toughness Index (TTI) |
|---|---|---|---|---|
| 1091 | 71 | 0.000198 | 53.1 | 54.6 |
| 1072 | 72 | 0.000193 | 65.4 | 64.9 |
| 996 | 37 | 0.00073 | 65.6 | 64.9 |
| 856 | 25 | 0.0016 | 51.1 | 49.3 |
| 1803 | 119 | 7.06 E-05 | 54.7 | 40.8 |
| 1674 | 137 | 5.33 E-05 | 54.5 | 45.6 |
| 1471 | 29 | 0.001189 | 53.1 | 64.8 |
| 393 | 32 | 0.000977 | 67.4 | 64.8 |
| 335 | 17 | 0.00346 | 72.8 | 68.1 |
| 611 | 50 | 0.004 | 66.5 | 68 |
| 1321 | 18 | 0.003086 | 56.5 | 54.4 |
| 1261 | 80 | 0.000156 | 60.1 | 55.6 |
| 1225 | 21 | 0.002268 | 62.2 | 67.2 |
| 1189 | 65 | 0.000237 | 62.7 | 66 |

It is clear that the average toughness of the CBN crystals increases with decreasing oxygen content for the variety of materials tested. The strength of the effect of oxygen content is approximately 50% higher (line slope in FIG. 2 versus FIG. 1) for materials after thermal treatment.

Example 2

The materials tested for FIGS. 1 and 2 represent a wide variety of synthesis chemistries, as noted above. If the tests are restricted to materials synthesized using a single chemistry system the influence of oxygen content on toughness becomes more pronounced. Thus TI testing of CBN crystals manufactured using a lithium nitride, lithium hydride, lithium hydroxide catalyst system was undertaken. The results of these tests are displayed in FIGS. 3 and 4, and in Table 2, below.

TABLE 2

| Average Oxygen Concentration (ppm) | Standard Deviation | Weight Assigned for Linear Regression | Toughness Index (TI) | Thermal Toughness Index (TTI) |
|---|---|---|---|---|
| 1803 | 119 | 7.06 E-05 | 54.7 | 40.8 |
| 1674 | 137 | 5.33 E-05 | 54.5 | 45.6 |
| 1471 | 29 | 0.001189 | 53.1 | 52.9 |
| 611 | 50 | 0.004 | 66.5 | 68 |
| 1321 | 18 | 0.003086 | 56.5 | 54.4 |
| 1261 | 80 | 0.00156 | 60.1 | 55.6 |
| 1225 | 21 | 0.002268 | 62.2 | 67.2 |
| 1189 | 65 | 0.000237 | 62.7 | 66 |

Figure 3:
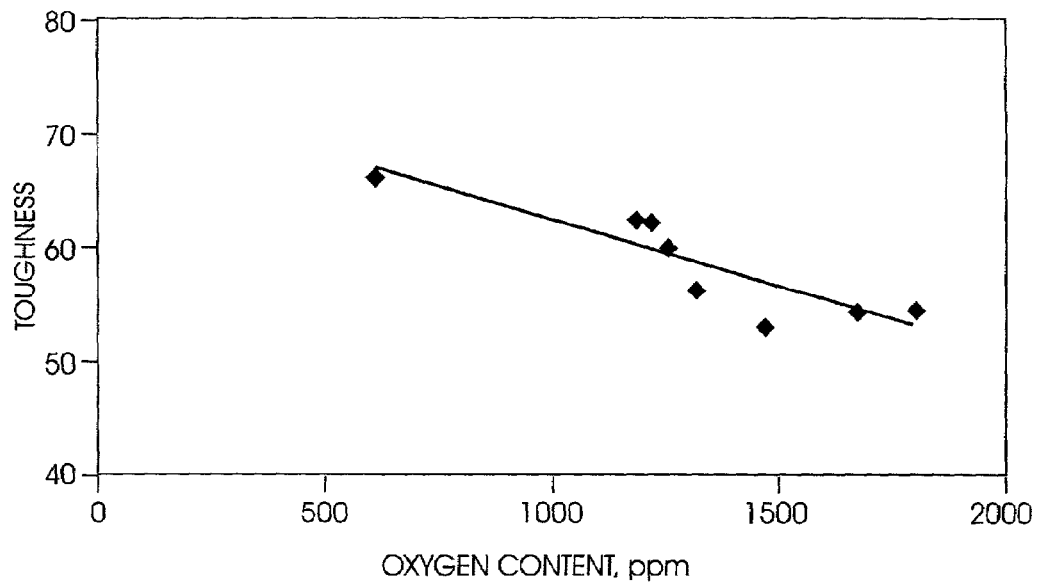
FIG. 3 plots crystal toughness versus oxygen content for CBN crystals as manufactured using one catalyst system.
Figure 4:
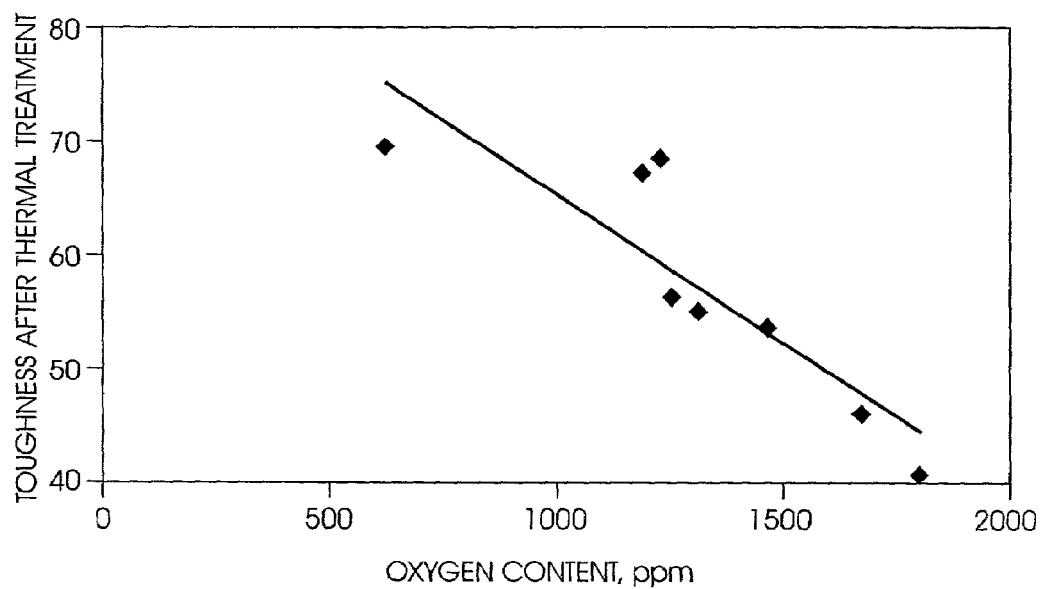
FIG. 4 plots crystal toughness versus oxygen content for CBN crystals manufactured using one catalyst system and which have been subjected to heat treatment.

As shown in FIGS. 3 and 4, the impact of oxygen content on toughness after thermal treatment is particularly high, as can be seen from the slopes of the curves. The improved correlation arises because fewer variables are uncontrolled when using the same catalyst system to synthesize crystals with varying oxygen content.

These test results lead to the conclusion that lower oxygen content improves toughness of CBN crystals, regardless of the chemistry used to synthesize the CBN crystals. Such tougher crystals are expected to exhibit a longer life in grinding or machining and, therefore, lead to a longer life of the tool. A long tool life leads to less tool wear and, ultimately, lower overall tool cost.

Example 3

In this example, Variant I represents CBN crystals made with a $Li_3N$, LiOH, LiH catalyst system. Variant II represents CBN crystals made with a $Li_3N$ LiH catalyst system in which the total amount of Li was the same as in the Variant I runs. Three runs of each catalyst system were conducted. The data recorded is set forth in Table 3, below.

TABLE 3

| Material | Oxygen (ppm) | | | Avg. Oxygen (ppm) | Std. Dev. Oxygen | TI | TTI | TI–TTI |
|---|---|---|---|---|---|---|---|---|
| | Run 1 | Run 2 | Run 3 | | | | | |
| Variant I | 1879 | 1863 | 1666 | 1803 | 119 | 54.7 | 40.8 | 13.9 |
| Variant II | 1305 | 1316 | 1341 | 1321 | 18 | 56.5 | 54.4 | 2.1 |

These results demonstrate that the use of oxygen containing catalysts contributes oxygen to the product CBN crystals, which lowers the TI and TTI of such crystals.

Example 4

In these series of runs, Variant I represents Variant I of Example 2. Variant III represents the same catalyst system, but with 0.12 wt-% of elemental Si added. Variant IV represents the same catalyst system, but with 0.2 wt-% of $Si_3N_4$ added (same Si content in Variant III). The data recorded is set forth in Table 4, below.

TABLE 4

| Material | Oxygen (ppm) | | | Avg. Oxygen (ppm) | Std. Dev. Oxygen | TI | TTI | TI–TTI |
|---|---|---|---|---|---|---|---|---|
| | Run 1 | Run 2 | Run 3 | | | | | |
| Variant I | 1879 | 1863 | 1666 | 1803 | 119 | 54.7 | 40.8 | 13.9 |
| Variant III | 1195 | 1250 | 1121 | 1189 | 65 | 62.7 | 66.0 | −3.3 |
| Variant IV | 1236 | 1201 | 1239 | 1225 | 21 | 62.2 | 67.2 | −5.0 |

These results demonstrate that both elemental Si as well as silicon nitride are effective oxygen getters. Impressive is the increase in thermal toughness index compared to room temperature toughness index.

Example 5

In this series of runs the affect of different concentrations of oxygen getter was evaluated. Variant V used the $LiNH_2$, LiH catalyst system with 0.75 wt-% of $Si_3N_4$ added. Variant VI used the same catalyst system, but with 1.8 wt-% of $Si_3N_4$ added. The results recorded are set forth in Table 5, below.

TABLE 5

| Material | Oxygen (ppm) | | | Avg. Oxygen (ppm) | Std. Dev. Oxygen | TI | TTI | TI–TTI |
|---|---|---|---|---|---|---|---|---|
| | Run 1 | Run 2 | Run 3 | | | | | |
| Variant I | 1879 | 1863 | 1666 | 1803 | 119 | 54.7 | 40.8 | 13.9 |
| Variant V | 392 | 362 | 426 | 393 | 32 | 67.4 | 64.8 | 2.6 |
| Variant VI | 343 | 315 | 346 | 335 | 17 | 72.8 | 68.1 | 4.7 |

These results again show improvement in toughness by dint of the addition of an oxygen getter. These results also demonstrate that, for the chemistry tested, the higher oxygen getter content is needed in order to lower the oxygen content to around the desired 300 ppm level. While the data reported herein has not yet achieved the target 300 ppm level of oxygen, it does demonstrate that for any given CBN chemistry, its toughness can be improved by lowering the oxygen content thereof. It also demonstrates that the target 300 ppm level can be achieved.

The invention claimed is:

1. A method for improving the toughness of a CBN product made by a high temperature/high pressure (HP/HT) process, which comprises the steps of:
   forming a blend of an oxygen getter and a CBN product-forming feedstock, wherein the oxygen getter comprises at least one material selected from the group consisting of nitrides of Al, Si, and Ti, carbides of Al, Si, and Ti, and mixtures thereof; and
   subjecting said blend to a CBN high temperature/high pressure (HP/HT) process for forming a CBN product, wherein said HP/HT process is conducted in the presence of a catalyst; and
   wherein the amount of oxygen getter in said blend is sufficient to improve the toughness of said CBN product.

2. The method of claim 1, wherein the oxygen getter comprises between about 0.005 and 0.5 weight-% of the blend.

3. The method of claim 1, wherein the HP/HT process is conducted in the presence of a catalyst devoid of oxygen content.

4. The method of claim 1, wherein the CBN product has an oxygen content of loss than about 300 ppm.

5. The method of claim 1, wherein the oxygen getter further comprises elemental titanium, aluminum, or silicon.

6. The method of claim 5, wherein the portion of titanium, aluminun, or silicon in the oxygen getter comprises between about 0.005 and 0.5 weight-% of the blend.

7. A method for improving the toughness of a CBN product made by a high temperature/high pressure (HP/HT) process, which comprises the steps of:
   forming a blend of an oxygen getter and a CBN product-forming feedstock, wherein to oxygen getter comprises at least one material selected from the group consisting of nitrides of Al, Si, and Ti, carbides of Al, Si, and Ti, and mixtures thereof; and
   subjecting said blend to a CBN high temperature/high pressure (HP/HT) process for forming a CBN product, wherein said HP/HT process is conducted in the presence of a catalyst;
   wherein the oxygen getter comprises between about 0.005 and 0.5 weight-% of the blend.

8. The method of claim 7 wherein the method yields a CBN product having an oxygen content of less than about 300 ppm.

9. The method of claim 7, wherein the oxygen getter further comprises elemental titanium, aluminum, or silicon.

10. The method of claim 9, wherein the elemental titanium, aluminum or silicon comprises between about 0.005 and 0.5 weight-% of the blend.

* * * * *

UNITED STATES PATENT AND TRADEMARK OFFICE
CERTIFICATE OF CORRECTION

PATENT NO. : 7,001,577 B2
DATED : February 21, 2006
INVENTOR(S) : Michael H. Zimmerman and Erik O. Einset It is certified that error appears in the above-identified patent and that said Letters Patent is hereby corrected as shown below:

<u>Title page,</u>
Item [73], Assignee, delete "innovaitons" and insert -- lnnovations --.

Signed and Sealed this

Eighteenth Day of April, 2006

JON W. DUDAS
*Director of the United States Patent and Trademark Office*